United States Patent

Hayes et al.

[11] Patent Number: 5,852,790
[45] Date of Patent: Dec. 22, 1998

[54] GLOBAL POSITIONING SYSTEM RECORDER AND METHOD GOVERNMENT RIGHTS

[75] Inventors: David W. Hayes; Kenneth J. Hofstetter; Robert F. Eakle, Jr., all of Aiken; George E. Reeves, Graniteville, all of S.C.

[73] Assignee: Westinghouse Savannah River Company, Aiken, S.C.

[21] Appl. No.: 635,476

[22] Filed: Apr. 22, 1996

[51] Int. Cl.$^6$ .................................................. G06F 165/00
[52] U.S. Cl. ................................................. 701/213; 701/35
[58] Field of Search .............................. 701/24, 29, 35, 701/115, 213–216, 200, 226; 340/988, 996; 342/357, 352, 457; 73/178 R; 455/12.1

[56] References Cited

U.S. PATENT DOCUMENTS

| | | | |
|---|---|---|---|
| 4,652,884 | 3/1987 | Starker | 342/357 |
| 4,853,859 | 8/1989 | Morita et al. | 701/35 |
| 4,884,208 | 11/1989 | Marinelli et al. | 701/300 |
| 5,225,842 | 7/1993 | Brown et al. | 342/357 |
| 5,305,219 | 4/1994 | Ishibashi et al. | 701/35 |
| 5,353,034 | 10/1994 | Sato et al. | 342/457 |
| 5,365,447 | 11/1994 | Dennis | 701/215 |
| 5,379,045 | 1/1995 | Gilbert et al. | 342/357 |
| 5,389,934 | 2/1995 | Kass | 342/357 |
| 5,392,052 | 2/1995 | Eberwine | 342/357 |
| 5,396,254 | 3/1995 | Toshiyuki | 342/357 |
| 5,398,034 | 3/1995 | Spilker, Jr. | 342/357 |
| 5,420,594 | 5/1995 | FitzGerald et al. | 701/215 |
| 5,493,294 | 2/1996 | Morita | 701/213 |
| 5,557,524 | 9/1996 | Maki | 701/35 |

OTHER PUBLICATIONS

GPS World, Nov. 1995 Book.
1996 Magellan Products Satellite Navigation and Communications brochure.
Astech brochure, Aug. 1995.
Rockwell International Handheld GPS Recovery Operator's Manual.
Scientific American, Feb. 1996, The Global Positioning System pp. 44–50.
ANS Transactions, 73, 81 (1995) San Francisco, Oct. 1995—Environmental Transport and Monitoring article.

*Primary Examiner*—William A. Cuchlinski, Jr.
*Assistant Examiner*—Gertrude Arthur
*Attorney, Agent, or Firm*—Hardaway Law Firms P.A.

[57] ABSTRACT

A global positioning system recorder (GPSR) is disclosed in which operational parameters and recorded positional data are stored on a transferable memory element. Through this transferrable memory element, the user of the GPSR need have no knowledge of GPSR devices other than that the memory element needs to be inserted into the memory element slot and the GPSR must be activated. The use of the data element also allows for minimal downtime of the GPSR and the ability to reprogram the GPSR and download data therefrom, without having to physically attach it to another computer.

26 Claims, 3 Drawing Sheets

GLOBAL POSITIONING SYSTEM RECORDER AND METHOD GOVERNMENT RIGHTS

GOVERNMENT RIGHTS

The United States Government has rights in this invention pursuant to Contract No. DE-AC09-89SR18035 between the United States Department of Energy and Westinghouse Savannah River Company.

BACKGROUND OF THE INVENTION

Global positioning systems (GPS) are well known. They involve the use of 24 satellites in Earth's orbit to allow a receiver unit associated with a movable object such as a boat or land vehicle (although they may also be hand-held) to determine the objects three-dimensional position on Earth's surface (altitude, longitude, latitude). This position data is then downloaded or transmitted via radio waves or digital communication to a remote location for storage, use, and/or analysis. As used herein, the term "GPS" is meant to include the GLONASS system of navigation satellites, which is the Russian equivalent to the United States' Department of Defense's GPS system. All GPS system's, i.e, the United States' GPS and the Russian's GLONASS, are available for use by the general public of all nations.

Traditionally, the data recorders used with global positioning systems have been bulky and/or complicated to use. First, prior art data recorders have required the setting of various operational parameters, such as the recording interval, a step which usually requires the services of a skilled technician. Accordingly, prior art data recorders could not be used by just anyone; a certain level of skill in the art is required. Furthermore, this set-up can be time consuming, causing individual GPS recorders to not be easily transferrable from user to user (due to possible different set-up requirements) and have substantial downtimes while they are reprogrammed.

Furthermore, traditionally, to set-up the data recorder it had to be connected to a personal computer-sized work-station via standard RS-232 ports and cables so that the set-up data could be transmitted to the data recorder. Similarly, to download the data gathered by the recorder, either a computer terminal (work-station) was carried by the vehicle to be tracked or the data recorder, itself, had to be taken to the computer work-station for the downloading of the data. Because these options increased the chance that data could be lost, neither of these options has proved acceptable in all situations.

An example of "one of today's most sophisticated GPS receivers" is the Rockwell Trooper (TM). As can be seen by the keyboard on this device that is used to set-up and change various parameters, the Trooper (TM) is not easy to use. Furthermore, while this device can have its recorded position data downloaded, it can only be done via direct connection of the Trooper (TM) to an external work-station or another Trooper (TM). Additionally, the Trooper (TM) has only a limited memory capacity. Finally, even though the Trooper (TM) has the capability to have stored position data downloaded out of the Trooper (TM) and displayed on a work-station screen, it does not allow for the merging of this stored position data into third party computer programs such as spreadsheet and mapping software.

Thus, there is room for improvement within the art.

OBJECTS OF THE INVENTION

It is an object of the invention to provide a global positioning system recorder that is easy to use.

It is a further object of the invention to provide a global positioning system recorder that does not require the operator carry out any complicated manual set-up to use.

It is still a further object of the invention to provide a global positioning system recorder that does not require physical connection to a personal computer-sized terminal or work-station to download positional data or change the set-up of the recorder.

It is still yet a further object of the invention to provide a global positioning system recorder that is very compact.

It is still yet a further object of the invention to provide a global positioning system recorder that can filter out unwanted GPS data and select the specific GPS data that it records.

It is still yet a further object of the invention to provide a global positioning system recorder that becomes operative automatically upon power up of the recorder.

It is still yet a further object of the invention to provide a global positioning system recorder that can have its saved GPS data transferred to a work-station and converted to ASCII characters for use in third party computer programs such as spreadsheets and mapping software.

These and other object of the invention are achieved by: a global positioning system recorder, comprising: a housing; an antenna external of the housing and for receiving signals from a plurality of navigation satellites; GPS circuitry inside the housing, the GPS circuitry electronically connected to the antenna, the GPS circuitry using the satellite signals to determine the position of the recorder; a memory element slot positioned in the housing such that a memory element can be inserted or removed from the slot without opening the housing; and control circuitry inside the housing, the control circuitry interfacing the GPS circuitry with the memory element slot such that operational data can be read from the memory element and position data can be written to the memory element.

Additionally, these and other objects of the invention are achieved by: a method of recording the global position of an object, comprising the steps of: providing an object with a global positioning system recorder having: GPS circuitry, control circuitry, an antenna, and a memory element slot; placing operational parameters for the recorder on a memory element; placing the memory element into the memory element slot; providing power to the recorder; the recorder automatically reading the operational parameters from the memory element; the GPS circuitry automatically determining the position of the object by use of signal emitted from GPS satellites and received by the antenna; and the control circuitry automatically writing the position of the object on the memory element in the form of at least one data file in accordance with the operational parameters.

Finally, these and other objects of the invention are achieved by a method of obtaining and using GPS data, comprising the steps of: providing a GPS receiver with a data recorder having a transferable memory element; the GPS receiver receiving data from GPS satellites; the GPS receiver using the GPS data to for a single GPS data string representing various GPS parameters; the GPS receiver filtering out unwanted GPS data from the GPS data string and writing wanted GPS data from the GPS data string to the transferable memory element in the form of a data file; removing the transferable memory element from the data recorder; placing the transferable memory element in contact with a computer work-station independent of the GPS receiver; reading the data file from the transferable memory element into the computer work-station; and manipulating the wanted GPS data saved in the read data file.

BRIEF DESCRIPTION OF THE DRAWINGS

FIG. One is a schematic view of a global positioning system recorder according to the invention.

FIG. Two is a perspective view of a remote work station for use with the global positioning system recorder according to the invention.

Figure 1:
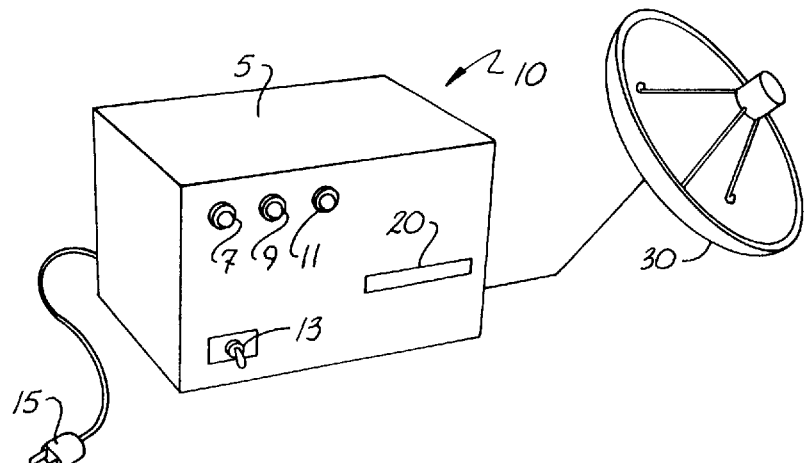
Figure 2:
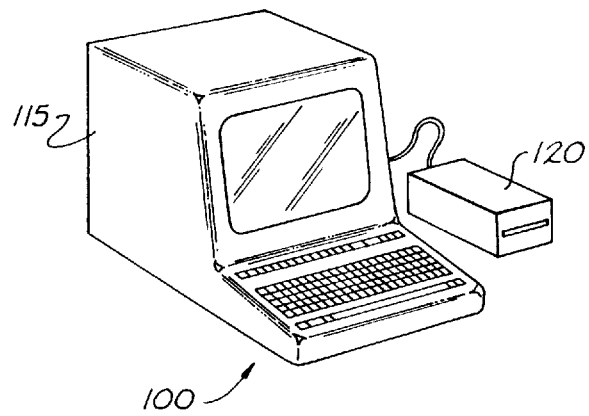

FIG. Three is a flow chart summarizing how the global positioning recorder according to the invention is used.

FIG. Four shows an example of how the data string received by the GPS card once per second is filtered and compressed into a smaller data string containing only wanted GPS data.

DETAILED DESCRIPTION OF THE DRAWINGS

A global positioning system recorder that meets and achieves the various objects of the invention set forth above will now be described with reference to the Figures.

Global positioning system recorder 10 (hereinafter "GPSR 10") comprises a small housing 5 (approximately 4"×6"×2") with three indicator lights 7, 9, 11, power switch 13, power cord 15, and a transferrable memory element receiving slot 20, such as, but not limited to, a PCMCIA slot. GPSR 10 can be made so small because it does not have to accommodate a keyboard, keypad, or display, as do other GPS units, e.g. the Trooper (TM). GPSR 10 has two separate sets of circuitry (not shown) therein, namely: (a) GPS circuitry containing a conventional GPS programming card such as can be purchased off-the-shelf from Rockwell or other manufacturers, and (b) control circuitry for controlling the GPSR, the GPS circuitry, and acting as an interface between the GPS circuitry and the slot 20. The control circuitry is microprocessor based and can be easily programmed by one skilled in the art to carry out the unobvious inventive steps described herein. Both sets of circuitry may also contain diagnostic programming for assuring that GPSR 10 is operating properly. The three lights respectively indicate that: the power to GPSR 10 is on, GPSR 10 is operational, and positional data is being automatically recorded by GPSR 10. GPSR 10 also has a small external antenna 30 for mounting, e.g., magnetically, to the outside of whatever is having its position recorded, e.g., a boat or car. However, it is also possible to attach or integrate the antenna with the housing to produce a hand-held GPSR 10, such as Rockwell's Tracker (TM). It is also possible to eliminate power switch 13 and provide GPSR 10 with conventional circuitry such that the circuitry of GPSR 10 is provided with power as soon as GPSR 10 is plugged into some power source, such as a vehicle cigarette lighter.

As stated above, traditionally, prior art GPS recording devices have required set-up by a skilled GPS operator prior to its use. Set-up has comprised setting within the GPSR certain operational parameters. These settings have been made either using a PC-sized terminal to which the prior art GPS recording device had to be physically connected, e.g., U.S. Pat. No. 5,392,052 (Eberwine), or, as is the case with the Trooper (TM), via a built-in keypad. Our invention eliminates the need for the GPS operator to be skilled or the burdensome attachment of the GPS receiver to a PC-terminal through the use of a conventional transferrable read/write memory element such as a flash memory card used with a PCMCIA slot.

Through the use of easy-to-use software written for a remote work-station 100 made up of DOS/PC compatible personal computer 115 fitted with a reader/writer 120 compatible with the memory element to be placed into slot 20 of GPSR 10, someone skilled in the art, such as a technician will be able to write to the memory element the necessary set-up parameters prior to use of GPSR 10, which itself may be used by another or either remain in a vehicle or in storage for later pick-up. Upon power-up, GPSR 10 will read these set-up parameters off of the memory element and set itself up, automatically. To date, in GPS systems, transferable memory elements have only been used to contain atlas-like information. E.g. U.S. Pat. Nos. 5,353,034 (Sato et al.) and 5,396,254 (Toshiyuki). Transferable memory elements have not been used in a GPS environment to contain set-up data read from or GPS data written to the memory element. While memory elements have been used in non-GPS environments, e.g., U.S. Pat. No. 5,305,219 (Ishibashi et al.), devices such as the one disclosed in Ishibashi do not take into account the specific needs of a GPS device, such as the need to vary the record interval or, as will be described below, the ability to filter out unwanted GPS data.

In operation, once per second, the off-the-shelf Rockwell GPS programming card transmits through its output leads a large amount of information that it receives from the GPS satellites. This information comprises approximately forty different GPS data items calculated by the GPS card using data from at least three GPS satellites. A single data string S (FIG. 4) containing all these GPS data items is 132 bytes long. These 132 bytes are broken down into a GPS data string leading word and a number of GPS data items or words $w_{0-64}$. All words comprises two characters (66 words×two characters=132 characters or bytes). It is rare that the average GPSR 10 user will need all these GPS data items since some of the items are used only in specialized circumstances, such as military applications. Furthermore, if all this GPS data is recorded on the memory element at each recording time (interval), the memory element will be quickly filled, mainly with unwanted data. Accordingly, by placement of certain data onto the memory element, the control circuitry of GPSR 10 can use this certain data to filter out unwanted GPS data from the GPS data string S and write only wanted GPS data to the memory element. For example, in most applications, the only GPS data items the user needs are: day, date, time, longitude, latitude, and altitude. A single data file containing only this GPS information is substantially smaller in length then the full GPS data string S. Thus, using this filtering feature to write smaller files to the memory element, substantially more useful GPS data can be written to the memory element. The technician, through use of the software described above, writes to the memory element the word positions representing the above-mentioned five parameters to be filtered out of the 66 word string. It is conceived that this writing to the memory element can be done in many ways. For example, the software for the work-station can be written so that it is preprogrammed to know which parameters the technician wants and the word locations of those parameters within the GPS data string S. Or, it is possible that the technician will be able to select which GPS data items out of GPS data string S he wants via menu or any other means. With the latter method, upon selection of a GPS data item that the technician wishes to have written to the memory element, the word locations of its associated words within the larger GPS data string S are written to the memory element. This selection and writing process would then be repeated for each GPS data item the technician wants GPSR 10 to write to the memory element. No matter how it is done, once the memory element has the appropriate word locations written thereon, they may be read into the control circuitry of GPSR 10 so that those words may be filtered out of the larger GPS data string S.

Once every two minutes, the GPS satellites transmit and, thus, the GPS card outputs, an entirely different set of GPS data items, i.e, GPS data string S'. It is rare that these GPS data items will be needed by the user but their output will often coincide with or be adjacent to the output of GPS data string S. Accordingly, some means is needed by which GPS data strings S and S' can be distinguished. This is achieved by looking for the third character in any given string, which is known as the message ID character (the first two characters are used to merely indicate to the control card that a data string is coming and are the same in both strings S and S'). If the third character is 67 in hexadecimal, i.e., 103 in decimal, the GPS data string is a normal string S. If the third character is 66 in hexadecimal, i.e., 102 in decimal, the string is not a normal string S and is ignored. The values of this third character are taken from the standard literature provided with the Rockwell GPS card and may or may not vary from one GPS card manufacturer to another.

Figure 4:
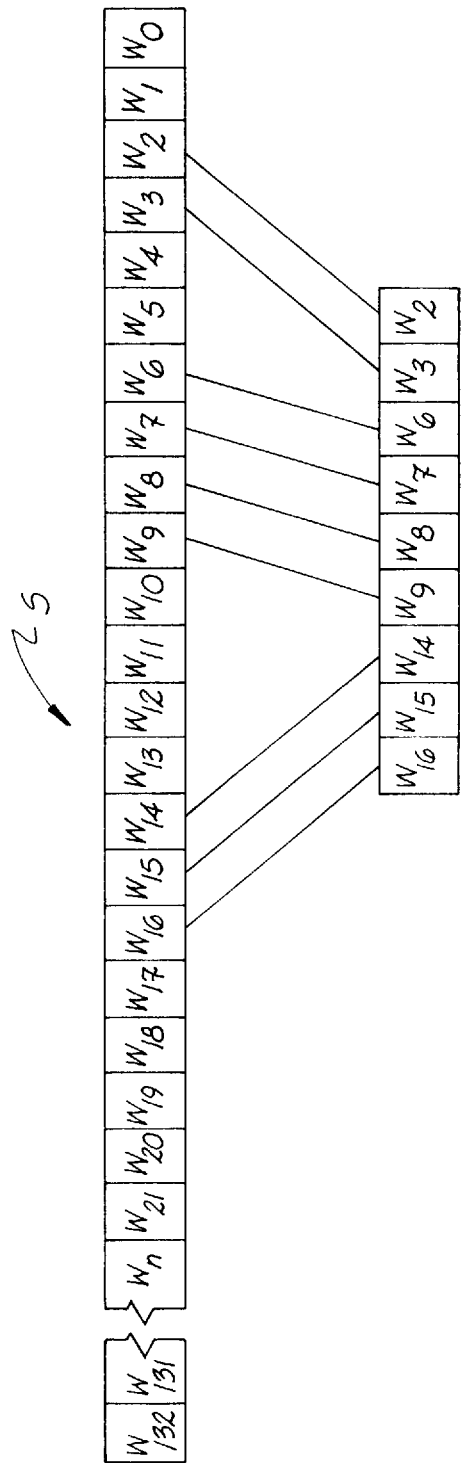

FIG. 4 shows how GPS data is collected in the instant invention. For example, as shown in FIG. 4, the GPS data string S may be reduced to a smaller data string comprised of the GPS data items formed by words $w_2$–$w_3$, $W_6$–$W_9$, $w_{14}$–$w_{16}$, whatever GPS data items those words may represent, e.g., altitude, time, etc. Thus, not only is GPS data string S filtered of its not needed GPS data items, it is also compressed (compacted). After the GPS data string S is filtered and compressed, it is written to the memory element. Because the memory element had been emptied of old files, the newly formed GPS data strings are written to the memory element in the order in which they are formed. This process continues until either the memory element fills up or the GPSR 10 is shut off and the memory element removed. How many time intervals of GPS data can be written to the memory element is determined by how much filtering out of unwanted GPS data is done.

Figure 3:
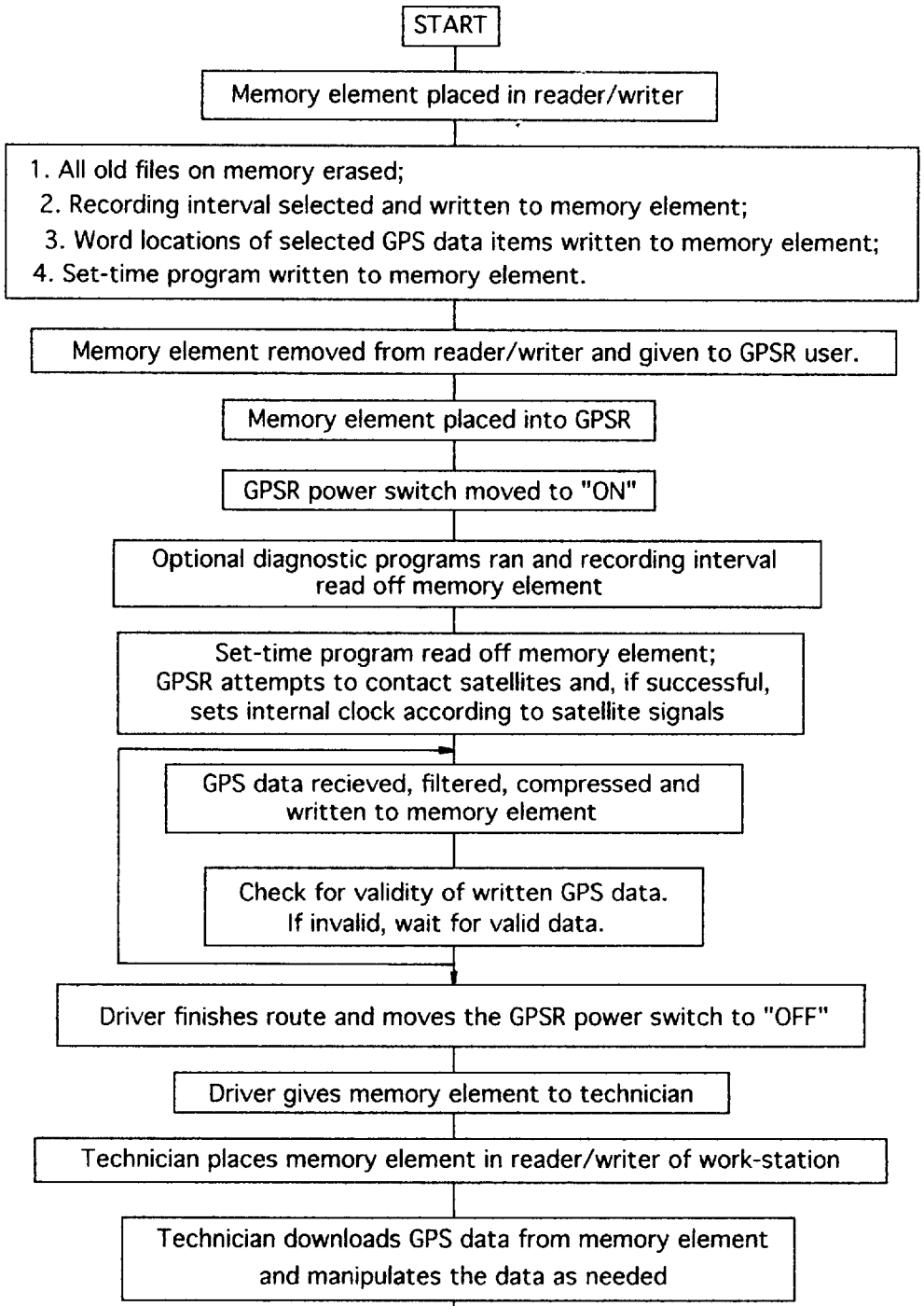

The flow chart of FIG. 3, which represents an example of how GPSR 10 operates, and can be used with remote work-station 100, will be described below.

A. The technician insert the memory element, in this case a conventional PCMCIA card, into reader/writer 120;

B. The technician starts the computer software program, which should preferably be menu-driven for simplicity. While it is not critical that the program is so driven, for purposes of description we will assume it is. The technician will use a first menu to set reader/writer 120 as the active drive of work-station 100. After the drive is set, either automatically, or after being prompted, all old GPS data files on the card will be erased to provide for maximum data space availability. The next menu or step is used to select the recording interval, e.g., 1–60 seconds. The instant invention provides greater flexibility than the prior art with respect to the ability to change this parameter. The recording interval selection is written in computer readable form onto card 20 through the use of reader/writer 120. Next, according to, for example, one of the two methods described above, i.e., writing the work-station program so that it knows which parameters or desired or allowing the technician to select which parameters he wants via a menu-driven program, the word locations of the particular GPS data items that the technician wishes to be filtered out of GPS data string S are written onto the card. Word locations within GPS data string S, in general, can be found by those skilled in the art using manuals provided by GPS card manufacturers. As for writing these word locations to the memory element, this can be done via, for example, direct entry in the case of writing the program to know which parameters are needed or a look-up table in the case of the menu-driven program. Then, after the set-time program described below is written to the memory card, the memory element contains everything GPSR 10 needs to operate;

C. The technician removes the memory card from reader/writer 120 and gives it to the person who will be using GPSR 10;

D. The user, e.g., a driver, takes the memory card to a vehicle that has been previously fitted with GPSR 10. GPSR 10 is connected to the vehicle's DC power through, for example, the vehicle's cigarette lighter and power cord 15. The driver inserts the memory card into card slot 20;

E. If present, the driver moves power switch 13 to the "ON" position. Power light 7 turns on;

F. GPSR 10 optionally runs various diagnostic programs contained in its control and GPS circuitries. The control circuitry of GPSR 10 reads the recording interval off of card 20 and places it into a RAM memory.

G. The set-time program is read off the card and into the control circuitry. Using this program GPSR 10 then tries to come into contact with GPS satellites. This is done in a novel manner. With the standard Rockwell GPS card, after it is shut off, it still retains within its memory which were the last three GPS satellites with which it was in contact. When the Rockwell GPS card is turned on again, it assumes it is still in the same location and tries to contact the same GPS satellites (GPS satellites are in geosynchronous orbits). However, it is foreseen that this assumption is not always correct. For example, GPSR 10 may be used to track a vehicle moving from location A to location B. After the vehicle arrives at location B, it may drive to location C, without use of GPSR 10. Then, the vehicle may need to be tracked as it travels to location D. With the Rockwell GPS card alone, this would require manual re-setting of the start point. However, by placing a set-time program either on memory element 20 and reading it into the control circuitry or actually burning the program into the ROM of the control circuitry, GPSR 10 can be programmed to do this itself. In particular, it is foreseen, that, according to this program, if, after a predetermined period of time, e.g., three minutes, the GPS card cannot contact the last three satellites with which it was in contact, then it merely looks for the first three satellites that it can come into contact with. After three GPS satellites are contacted, the control card determines whether the GPS card is receiving valid GPS data from the three GPS satellites (as determined by the control card looking for the value of the GPS parameter-UTC validity). If so, the set-time software [on our memory card that is read into the control card] sets the day, date, and time of GPSR 10 from signals received from the three satellites. Assuming this is all done successfully, ready light 9 turns on;

H. According to a signal generated by the control circuitry at the set recording interval, third indicator light 11 turns on, indicating GPSR 10, via the GPS circuitry, is now receiving GPS satellite data from at least three GPS satellites and is determining the position of GPSR 10 the once per second that the GPS satellites are emitting such GPS data. Assuming that a recording interval has been reached, after the full 132 byte data string is received and determined to contain the wanted GPS data, i.e., GPS data string S distinguished from GPS data string S', the technician-selected GPS data items are picked out of string S as described above and written to the RAM of the control card in the order in which they appear in string S, subject to the removal of any unwanted intermediate GPS data items. Thus, string S is filtered and compressed. Then, finally, the filtered and compressed data string within the RAM of the control card is written to the memory card. The string will be named according to, e.g., the clock time at which ready light 9 turned on. As each record interval is reached, the read data will be appended to the end of the same file. This will continue until the file reaches a predetermined maximum size regulated or controlled by the third party program with which the data will be used, i.e., maximum spreadsheet file size (see below). After the file reaches its maximum size a new file is created on the memory element. However, if third party software is not being used, the file can grow so long as there is room on the memory card. In any event, a conventional 2 megabyte flash memory card can contain files holding about 50,000 date (day, month, year), time, and location (latitude, longitude, and altitude) measurements;

I. If at any time during data acquisition, the control cards determines, by looking at the UTC validity parameter, that the data being received by the GPS card is invalid, the first set of invalid data is written to the card. Then, until the UTC validity parameter indicates valid data is being outputted from the GPS card, data is not written to the memory card. Thus, when the technician later looks at the downloaded GPS, if a gap in time greater than the selected interval between data is identified, he knows that invalid data was being receiving for some time. Invalid data stems from, for example, interference between the GPS satellites and the antenna.

J. Upon the driver's completion of his route and return of the vehicle to the depot, etc., and after shutting off GPSR 10 (turning power switch 13 to the "OFF" position), the driver removes the memory card from GPSR 10;

K. The memory card is then given back to a trained technician;

L. The technician places the memory card back into card reader/writer 120; and

M. Through the software for work-station 100, the technician can read and download the saved binary GPS data files off of the memory card and into PC 115. The software will then convert the binary data into ASCII data. The software knows where in each data file, i.e., the string location, each piece of GPS data, e.g., date, latitude, etc., is located. This can be achieved via direct programming or a look-up table, (containing data locations verses data items) as described above. With each data item, a binary to ASCII conversion equation, obtainable from the literature provided by the GPS card manufacturer, is used to make the conversion. After the data is in ASCII form, any number of things can be done with it, such as but not limited to using the data with spreadsheets, mapping programs, and the like. With software provided with, for example, the Rockwell GPS card, it has not been possible to manipulate the downloaded GPS data in this way. The prior art software has been of a write-to-the-screen-only type, in which the operator had to slow down the screen scrolling as the data was written thereto to manually write down the data, etc. However, with the instant invention, it is possible to do any number of things to the data in a non real-time environment.

As can be seen from the above description, because GPSR 10 need not be moved and physically attached to PC 115 to download the data, there is less of a chance of data loss. Furthermore, the GPSR 10 is immediately available for the next user, who must only insert the pre-programmed memory card into the slot; GPSR 10 is not tied up in a lab while being reprogrammed or having the recorded data downloaded therefrom.

As can also be seen that through use of the GPSR 10 according to the invention, the vehicle driver does not have to have any knowledge of how GPSR 10 operates other than that it must have the memory card inserted in slot 20 and have its power turned on. All the details of its programming and operation are left to trained technicians who are better positioned to handle such matters.

Finally, it should be noted that it is possible to add yet additional flexibility to GPSR 10. In particular, the technician can vary the once-per-second frequency at which the GPS card outputs GPS data string S to the control card. By having the technician additionally write to the transferable memory element the interval at which he wants the GPS card to output GPS data string S, frequencies of up to once-per-second can be achieved. While this is not a problem in GPSR's using an unlimited power source, such as a vehicle cigarette lighter, if a hand-held battery operated GPSR is being used, care has to be taken not to unduly drain the battery. Increasing the frequency with which data is written to memory element 20 causes more power to be used by GPSR 10 and therefore, the battery will die faster. In most instances, write frequency of once per 20–30 seconds is acceptable.

The above description is given in reference to a specific example of a global positioning system recorder. However, it is understood that many variations are apparent to one of ordinary skill in the art from a reading of the above specification and such variations are within the spirit and scope of the instant invention as defined by the following appended claims.

That which is claimed:

1. A method of recording the global position of an object, comprising the steps of:

providing an object with a global positioning system recorder having: GPS circuitry, control circuitry including programming, an antenna, and a memory element slot;

placing operational parameters for said recorder on a memory element;

placing said memory element into said memory element slot;

providing power to said recorder;

automatically reading said operational parameters from said memory element using said recorder, said automatic reading step controlled by said programming and performed after said providing power step;

automatically determining the position of said object with said GPS circuitry by use of a signal emitted from GPS satellites and received by said antenna; and automatically writing said position of said object on said memory element in the form of at least one data file in accordance with said operational parameters using said control circuitry, said automatic writing step controlled by said programming and performed after said automatic reading step.

2. The method according to claim 1, wherein said step of placing operational parameters on said memory element includes setting a recording interval.

3. The method according to claim 1 wherein said step of placing operational parameters on said memory element is carried out at a remote location independent from said recorder.

4. The method according to claim 1 further comprising the step of removing said memory element from said slot and taking it to a remote location independent from said recorder to have said at least one data file downloaded from said memory element.

5. The method according to claim 1, further comprising the step of determining whether the GPS position determined is valid.

6. The method of recording the global position of an object as recited in claim 1, wherein said automatic writing step further comprises the step of filtering out an unwanted portion of said signal from said GPS satellites.

7. A global positioning system recorder, comprising:
a housing;
an antenna external of said housing and for receiving signals from a plurality of navigation satellites;
GPS circuitry inside said housing, said GPS circuitry electronically connected to said antenna, said GPS circuitry using said satellite signals to determine the position of said recorder;
a memory element slot positioned in said housing such that a memory element, containing operational parameters for said recorder, can be inserted or removed from said slot without opening said housing;
control circuitry inside said housing, said control circuitry interfacing said GPS circuitry with said memory element slot such that operational data can be read from said memory element and position data can be written to said memory element, said control circuitry including programming that upon providing said GPS and said control circuitry with power, said programming causes said recorder to automatically read said operational parameters from said memory element and then write position data to said memory element; and
means for providing said GPS and said control circuitry with power.

8. The recorder according to claim 7, wherein said operational parameters includes a recording interval.

9. The recorder according to claim 8, wherein operational parameters are written to said memory element at a remote location and said position data is downloaded from said memory element at said remote location.

10. The recorder according to claim 9, wherein after said GPS circuitry determines the position of said recorder, said control circuitry causes said position data to be written to said memory element according to said operational parameters.

11. The recorder according to claim 7, wherein said programming for automatically reading comprises:
programming for repeatedly attempting to contact the GPS satellites with which the GPS recorder was last in contact, said programming stopping said attempts if after a predetermined amount of time said attempts are unsuccessful, said program also contacting at least three GPS satellites upon stopping said attempts and using data from at least said three satellites to determine the position of the GPS recorder;
programming for determining whether the position determined by said GPS recorder is valid.

12. The global positioning system recorder as recited in claim 7, wherein said control circuitry further comprises a filter to remove an unwanted portion of said satellite signals, whereby said recorder only utilizes a wanted portion of said satellite signals.

13. A method of obtaining and using GPS data, comprising the steps of:
providing a GPS receiver with a data recorder having a transferable memory element;
said GPS receiver receiving data from GPS satellites;
said GPS receiver using said GPS data to form a single GPS data string representing various GPS parameters;
said GPS receiver filtering out unwanted GPS data from said GPS data string and writing wanted GPS data from said GPS data string to said transferable memory element in the form of a data file;
removing said transferable memory element from said data recorder;
placing said transferable memory element in contact with a computer work-station independent of said GPS receiver;
reading said data file from said transferable memory element into said computer work-station; and
manipulating said wanted GPS data saved in said read data file.

14. The method according to claim 13, wherein:
said wanted GPS data is in binary form; and
said step of manipulating said wanted GPS data includes converting said binary form data into ASCII form data.

15. The method according to claim 14, wherein said step of manipulating said wanted GPS data further comprises using said ASCII form data with a third-party data manipulating program.

16. The method according to claim 15, wherein said third-party data manipulating program comprises a spreadsheet program.

17. The method according to claim 15, wherein said third-party data manipulating program comprises a mapping program.

18. The method according to claim 13, further comprising the step of adjusting the interval at which said GPS receiver filters out said unwanted GPS data from said GPS data string and writes said wanted GPS data from said GPS data string to said transferable memory element.

19. The method according to claim 18, wherein said transferable memory element has written thereon said interval at which said GPS receiver filters out said unwanted GPS data from said GPS data string and writes said wanted GPS data from said GPS data string to said transferrable memory element.

20. The method according to claim 13 further comprising the step of changing which GPS data from said GPS data string is filtered out and which GPS data from said GPS data string is written to said transferrable memory element.

21. The method according to claim 20, wherein said step of changing which GPS data is filtered out from said GPS data string and which GPS data from said GPS data string is written to said transferrable memory element comprises:
a technician selecting which GPS data items transmitted by GPS satellites the technician needs to have written to said transferrable memory element; and
determining the position of said selected GPS data items in said GPS data string;
writing the positions and of said selected GPS data items to said transferrable memory element; and wherein said filtering step comprises writing the GPS data found at said positions within said GPS data string to said transferable memory element.

22. The method according to claim 21, wherein said step of determining the position of said selected GPS data items in said GPS data string further comprises said technician looking it up in a manual.

23. The method according to claim 21, wherein said step of determining the position of said selected GPS data items in said GPS data string further comprises said work-station having them programmed therein.

24. The method according to claim 13, further comprising the step of looking for a character in said GPS data string that indicates that the GPS data string being received by said GPS includes the technician selected GPS data items.

25. The method according to claim 24, wherein said step of looking for a character comprises looking for the value of the third character in said GPS data string.

26. The method according to claim 13, further comprising the step of writing to said transferable memory element the interval at which said GPS receiver is to receive GPS data strings from said GPS satellites.

* * * * *